United States Patent [19]

Hughes et al.

[11] Patent Number: 4,664,494

[45] Date of Patent: May 12, 1987

[54] ELECTRONIC FOCAL PLANE SHUTTER

[75] Inventors: John G. Hughes, Cary; Thomas R. Hodek, Barrington; Wayne Hamlin, Woodstock, all of Ill.

[73] Assignee: Recon/Optical, Inc., Barrington, Ill.

[21] Appl. No.: 823,368

[22] Filed: Jan. 28, 1986

[51] Int. Cl.[4] ............................ G03B 7/10; G03B 9/34
[52] U.S. Cl. .................................. 354/234.1; 354/244
[58] Field of Search ...................... 354/234.1, 243, 244

[56] References Cited

U.S. PATENT DOCUMENTS

| | | | |
|---|---|---|---|
| 3,554,106 | 1/1971 | Baumgarten | 354/243 |
| 3,577,901 | 5/1971 | Gray | 354/243 |

Primary Examiner—Michael L. Gellner

Attorney, Agent, or Firm—Neuman, Williams, Anderson & Olson

[57] ABSTRACT

A photographic shutter includes first and second curtains having opaque portions terminating at first and second edges which are positionable in spaced relation to define an exposure slit. Rollers support the curtains for movement of the slit in a certain path and through an exposure region. Electrical servo motors drive the curtains to control the width of the slit and to move the slit through the exposure region. A digital control circuit develops a command signal for control of movement of the slit through the exposure region. A drive circuit controls the servo motors in accordance with the command signal to obtain a certain velocity of movement of said slit at each position of said slit in said exposure region.

11 Claims, 4 Drawing Figures

ELECTRONIC FOCAL PLANE SHUTTER

This invention relates to an electronic focal plane shutter and more particularly to a shutter which is electronically controlled in a manner such as to obtain highly accurate, smooth and reliable control of the width and movements of an exposure slit, but with features of mechanical simplicity and other features such that the shutter is readily and economically manufacturable. The electronic control is versatile and is such that any desired widths and movements of the exposure slit can be readily obtained.

BACKGROUND OF THE INVENTION

In focal plane shutters of the prior art, curtains are positioned with edges thereof in spaced relation to define a slit which is moved through an exposure region to expose film to a transmitted image. One prior type of shutter has a drive which includes a drive motor, clutches, brakes, cams, a differential gearing assembly and springs. In a winding part of a cycle, the drive operates to close the slit and to wind the springs. In an exposure part of the cycle, the differential gearing is used to position the curtains to provide an open slit and then the springs are released to move the slit across the exposure region with the velocity of movement being controlled by the cams and associated friction means.

Another prior type of shutter includes clutches operable to drive curtains from a continuously operating electrical motor and a differential gearing assembly and braking arrangement are provided which permits one curtain to be braked while driving the other, to adjust slit width prior to an exposure operation. This type of shutter may be made to operate in either direction, exposures being made in both directions of movement of the curtains.

Such prior types of shutters have required careful construction with precision parts and have been somewhat expensive as a result. However, the users thereof have generally been very satisfied with their performance and reliability.

SUMMARY OF THE INVENTION

This invention was evolved with the general object of improving upon prior types of shutters, with respect to obtaining enhanced performance and reliability and ease and accuracy of control, and also with respect to facilitating manufacture of shutters and reducing the cost thereof.

An important aspect of the invention relates to the recognition that prior types of shutters have limitations which result from the use of gearing, cams and other mechanical components and which might be avoided if the movement of the shutter curtains could be more directly controlled from electrical signals. In shutters constructed in accordance with the invention, a servo motor is provided which is coupled to the shutter curtains and which is controlled from an electrical command signal to control movement of a slit through an exposure region. In one embodiment of the invention, an electrical signal corresponding to the instantaneous position of the slit is developed by a potentiometer and is compared with the command signal to develop a drive signal for the servo motor, the arrangement being such as to obtain highly accurate control of the instantaneous position of the slit. The velocity of movement of the slit through the exposure region may be maintained substantially constant, as is desirable in most applications. In addition, the acceleration of the slit prior to reaching the exposure region and deceleration of the slit after going through the exposure region may be accurately controlled to minimize the forces applied to the parts and to obtain smooth and reliable operation.

In accordance with additional important features of the invention, two servo motors are provided which are coupled separately at two curtains. For control of the width of the slit, an operation is performed prior to the exposure operation, a slit width command signal being applied to both motors differentially. An electrically operated clutch is provided which is operable to interconnect the curtains during an exposure operation and to insure that the slit is maintained at a constant width. Preferably, both motors are energized during the exposure operation to share the drive of the curtains and to minimize loading of the clutch. Also, separate servo components may be used for the two motors, with there being separate position feedback transducers, separate comparators and separate electronic compensation circuits and amplifiers.

Further important features of the invention relate to the development of the slit position command signal and the slit width command signal, using digital circuitry which permits accurate generation of the signals in a highly reliable manner. The slit position command signal is generated from digital signals stored in a memory. In an illustrated embodiment, data which correspond to a profile of the desired displacement of the curtains with time are stored in successive addresses of a memory circuit such as an EPROM. In an exposure operation, successive address signals are applied to the memory circuit to develop digital data signals which are converted to an analog signal by a digital-to-analog converter, the analog signal being applied to analog comparator circuits of the servo loops for the two motors.

Further features of the invention relate to the support of the shutters and connections thereof to the motors with an arrangement which is mechanically simple and which permits highly accurate and reliable control of the shutter movements. Each shutter curtain is supported between the peripheries of rollers on a pair of shafts which are journaled on spaced parallel axes. The shaft of each motor is coupled to one roller support shaft and a simple clutch is provided to couple both sets of rollers together.

This invention contemplates other objects, features and advantages which will become more fully apparent from the following detailed description taken in conjunction with the accompanying drawings.

DESCRIPTION OF A PREFERRED EMBODIMENT

Figure 1:
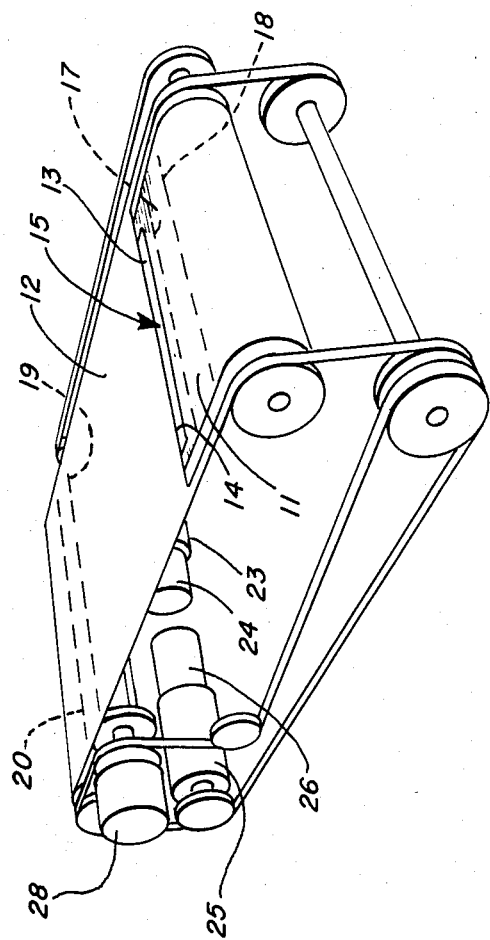
FIG. 1 is a diagrammatic perspective view of a focal plane shutter assembly constructed in accordance with the principles of the invention.

Reference numeral 10 generally designates an electronic focal plane shutter constructed in accordance with the principles of this invention. The shutter 10 includes an inner curtain 11 and an outer curtain 12 which are opaque with edges 13 and 14 positionable in spaced relation to define a slit 15 movable through an exposure region or format area. In movement in one direction, the midpoint of the slit 15 moves from one limit position as indicated by dotted line 17, then to a position as indicated by dotted line 18 which defines one edge of the format area, then to a position as indicated by dotted line 19 which defines an opposite edge of the format area and then to a second limit position as indicated by dotted line 20.

Support and drive components for the curtains 11 and 12 are described in detail hereinafter in connection with FIG. 4. In general, they include an inner curtain drive motor 23 and associated position sensing potentiometer 24, an outer curtain drive motor 25 and associated position sensing potentiometer 26 and an electrically energizeable clutch 28 which controls mechanically coupling and decoupling of the drives of the inner and outer curtains 11 and 12.

Figure 2:
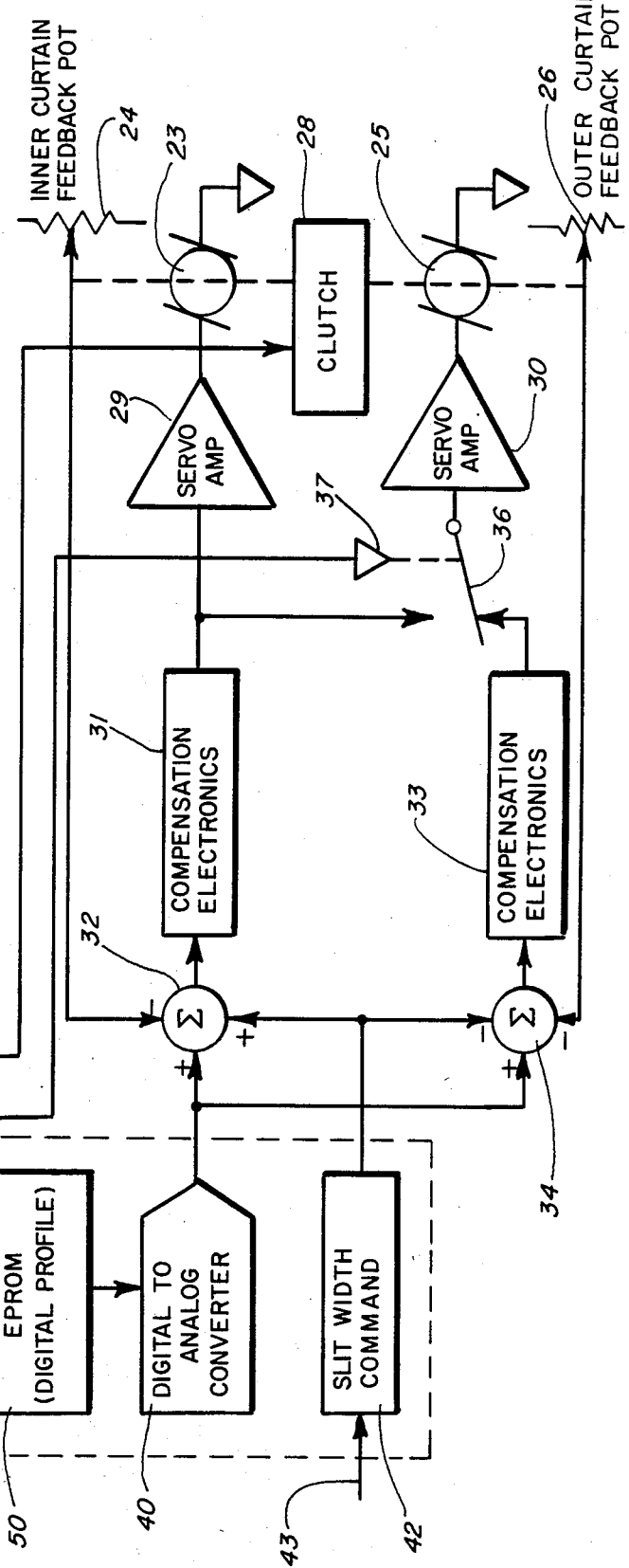
FIG. 2 is a schematic diagram of electrical circuitry for control of motors and a clutch of the shutter assembly of FIG. 1.

Referring to the schematic diagram of FIG. 2, the inner and outer curtain drive motors 23 and 25 are connected to the outputs of servo amplifiers 29 and 30. The input of amplifier 29 is connected through compensation circuitry 31 to the output of a summing circuit 32 and the input of the amplifier 30 is connected either to circuitry 31 or through compensation circuitry 33 to a second summing circuit 34, depending upon the position of a switch 36 which is electronically controlled through a buffer 37 from a control logic circuit 38, as diagrammatically illustrated. Each of the summing circuits 32 and 34 has three inputs. Minus inputs thereof are connected to the potentiometers 24 and 26, to receive position feedback signals therefrom. Plus inputs of the two summing circuits are connected together and to the output of a digital-to-analog converter 40 to receive a position command signal therefrom. A plus input of summing circuit 32 and a minus input of summing circuit 34 are connected together and to the output of a slit width command signal circuit 42 which may be controlled manually or automatically from a light sensing circuit, through a control line 43.

In the position of the switch 36 as shown, the width of the slit 15 may be adjusted. The position command signal from the digital-to-analog converter 40 is maintained at a fixed level and the clutch 28 is disengaged. Then the magnitude of the slit width command signal from circuit 42 is changed to cause a change in the output signal of summing circuit 32 in one direction and a change in the output signal of the summing circuit 34 in the opposite direction. Such output signals are applied through the compensation circuits 31 and 33 and through the amplifiers 29 and 30 to cause the motors 23 and 25 to drive the inner and outer curtains 13 and 14 in opposite directions until the feedback potentiometers apply signals of amplitudes such as to restore the summing circuits 32 and 34 to balanced conditions.

Figure 3:
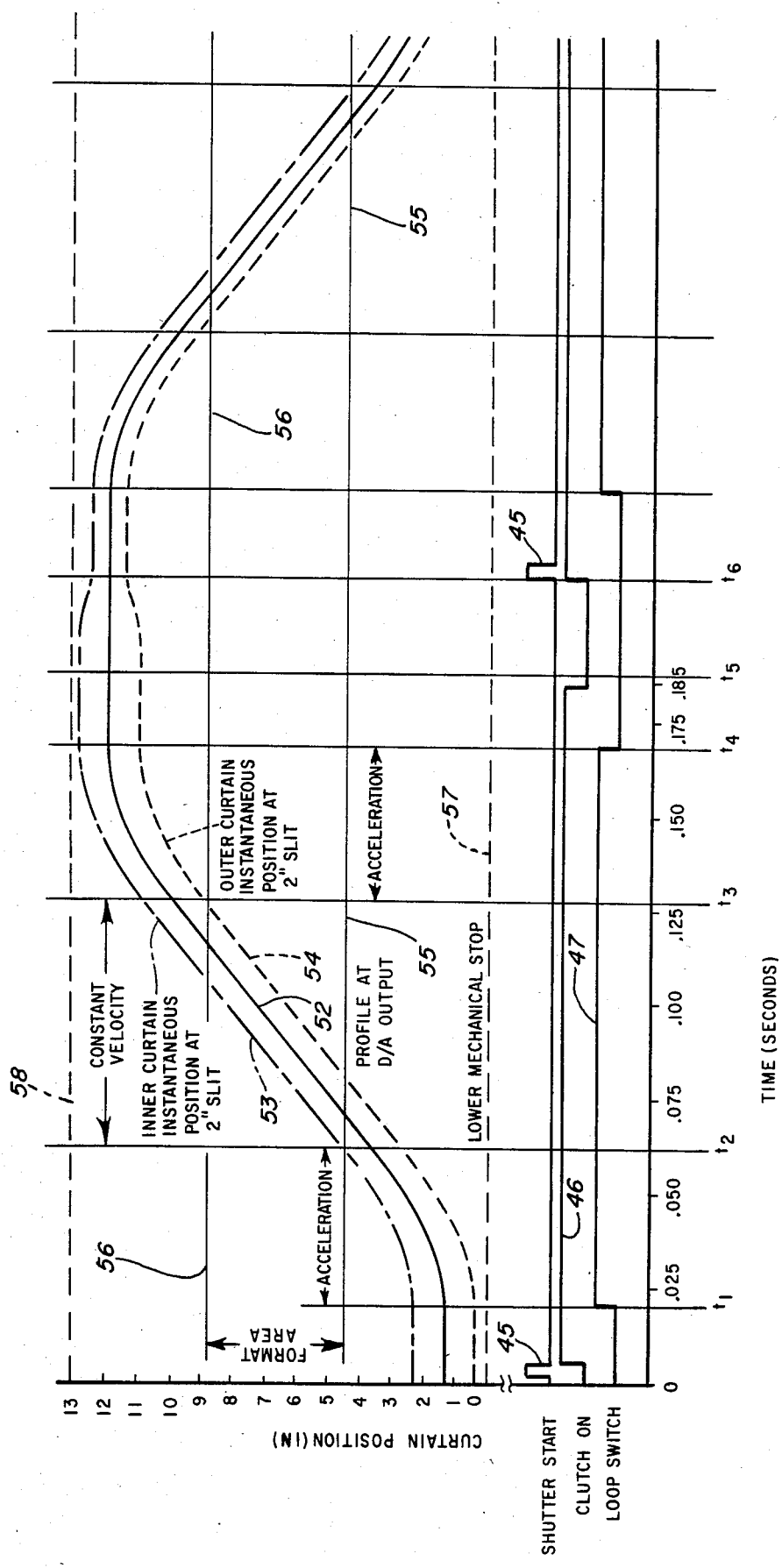
FIG. 3 is a diagram illustrating graphically, on a time base, the positions of shutter elements and the form of electrical control signals.

To initiate an exposure operation, a shutter start pulse 45 (FIG. 3) is applied to the control logic circuit 38 which applies a signal to the clutch 28 at a high level as indicated by reference numeral 46 in FIG. 3, such that the clutch 28 is engaged. After a delay, at a time t1 as indicated in FIG. 3, a signal is applied to the buffer 37 at a high level, as indicated by reference numeral 47 to operate switch 36 and connect the inputs of both servo amplifiers 29 and 30 through the compensation circuit 31 to the output of the summing circuit 32. At about the same time t1, the control logic circuit 38 applies control signals to a counter 48 which may be a 12 bit counter, for example, and which is driven from a source of clock pulses associated therewith. Counter 48 applies sequential address signals to an EPROM 50 which has output data lines connected to the digital-to-analog converter 40. The clock pulses may be applied at a fixed frequency which may be approximately 22 KHz, for example, or may be applied at a variable or adjustable frequency to control the velocity of movement of the shutter curtains. As diagrammatically illustrated, the counter 48 may be connected to a control line 49 for control of the frequency of the clock source associated with the counter 48, or for receipt of clock pulses from an external clock pulse source.

The EPROM stores position profile data which is clocked out to the converter 40 to cause the converter 40 to generate an output signal which has a form as illustrated by the solid line curve 52 in FIG. 3 and which corresponds to the position of the mid-point of the slit 15. The position of the edge 13 of the inner curtain 11 is indicated by the broken line 53 while the position of the edge 14 of the outer curtain 14 is indicated by the dashed line 54.

The position profile data is such that from time t1 to a time t2, there is a gradual and smooth acceleration. After time t2 and until a time t3, the velocity is maintained constant. Then, from time t3 to a time t4, there is a gradual and smooth deceleration, a zero velocity being reached at time t4. The velocity is maintained constant throughout the exposure region or format area which, as indicated in FIG. 3, extends from a position as indicated by horizontal line 55 to a position as indicated by horizontal line 56. Mechanical stops are indicated by horizontal dashed lines 57 and 58.

Before the next operation, the width of the slit may be changed, if desired. The switch control signal 47 may be brought low at time t4 and thereafter the clutch control signal, indicated by reference numeral 46, may be brought low to disengage the clutch 28. Then between time t5 and the start of a following cycle, at time t6, the width of the slit 15 may be adjusted, a reduction in width being illustrated in FIG. 3.

In the following exposure operation, starting at time t6, the operation as aforedescribed, is repeated, except that the movements are in the reverse direction. In this case, the counter 48 may operate in the reverse direction, i.e., to count down rather than up, and to apply a reversed sequence of address signals to the EPROM 50.

The use of an EPROM is advantageous in that it can be readily programmed and in that it can be reprogrammed if desired. It will be understood that a mask-programmed ROM, a PROM, an EEPROM, a RAM arranged to be energized for long time periods or other types of memory devices may be used.

With the arrangement of the invention, an operating profile is obtained which includes smooth acceleration and deceleration portions and a constant velocity portion and which has the same form regardless of the frequency of the clock pulses which drive the counter 48. Also, the servo drive arrangement is such that the actual velocity is proportional to the amplitude of the constant velocity portion, with a high degree of accuracy. Thus through accurate control of the frequency of the clock pulses, the actual velocity is controlled with high accuracy. At the same time, the velocity can be adjusted or controlled through control of the clock frequency while retaining the same operating profile and its smooth acceleration and deceleration portions.

Figure 4:
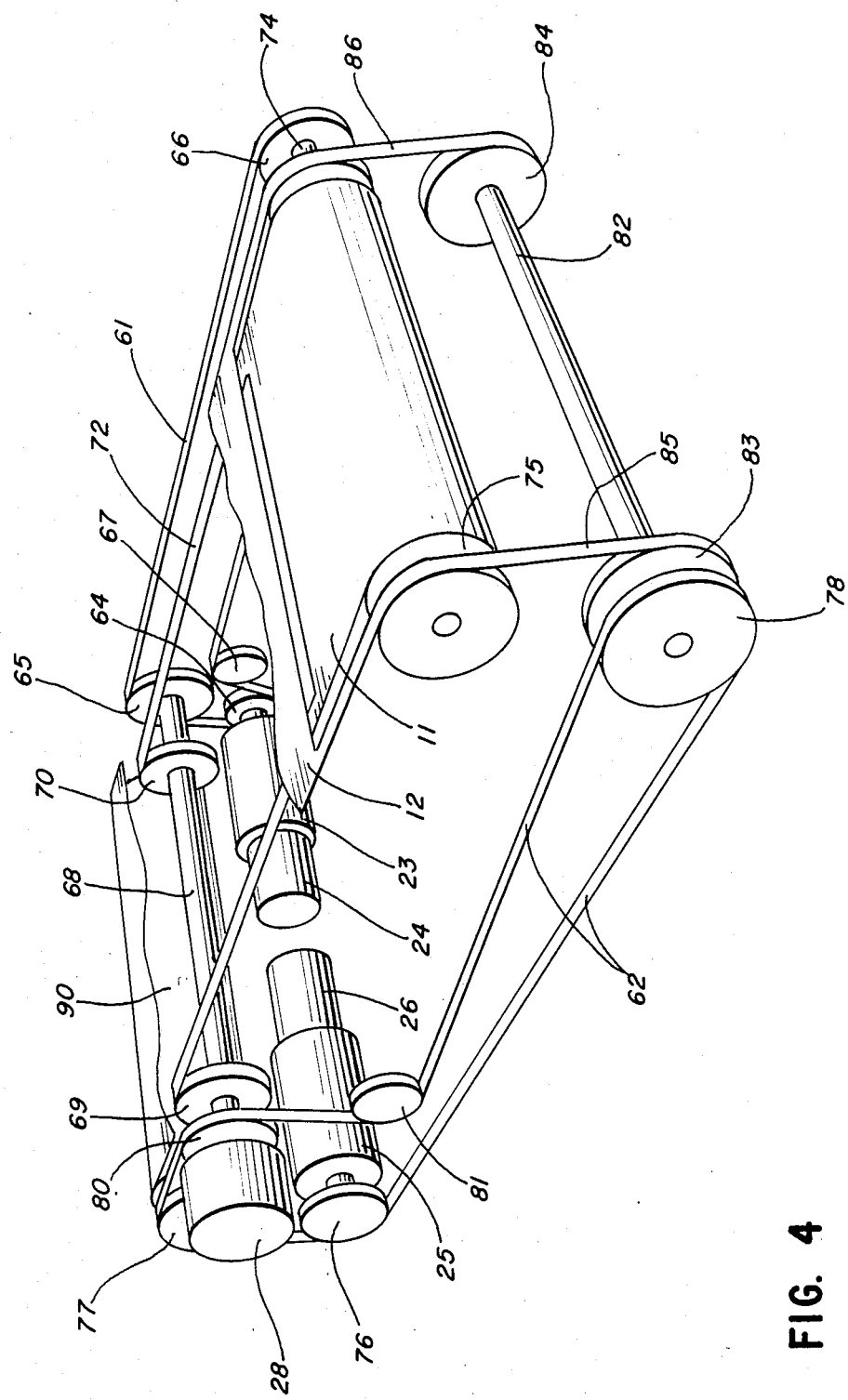
FIG. 4 is a diagrammatic perspective view of the shutter assembly, similar to FIG. 1 but on an enlarged scale with portions of curtains broken away to show certain components more clearly.

Referring to FIG. 4, the inner and outer curtains 11 and 12 are driven from a pair of timer belts 61 and 62 which are of conventional form with teeth on one side of each belt being engaged with the teeth of sprockets or pulleys. The teeth are not shown to simplify illustration.

The inner curtain drive belt 61 is entrained on a pulley 64 on the shaft of the motor 23 and pulleys 65 and 66 at the rearward and forward ends of the shutter assembly. An idler pulley 67 is provided in engagement with the back or untoothed side of the belt 61, between rollers 64 and 66. The rearward pulley 65 drives a shaft 68 which carries two rollers 69 and 70 on which side extension strips 71 and 72 of the inner curtain 11 are wound. The forward pulley 66 drives a shaft 74 which is connected through a spring to a roller 75 on which the inner curtain is wound. The spring is not shown but is similar to a spring of a conventional window shade and is wound on the shaft 74 within the roller 75 with one end being connected to the shaft 74 and the other being connected to the roller 75. In assembly, the relationship of the belt 61 to the forward pulley 66 is adjusted to produce a certain torsion in the spring and to tension the curtain 11 and the side extension strips 71 and 72 thereof. It is noted that the curtain tension is resisted by toothed belt tension thus preventing the spring tension from loading the servo motor.

A similar arrangement is used for the outer curtain drive belt 62. It is entrained on a pulley 76 on the shaft of the motor 25 and on rearward and forward pulleys 77 and 78 and also on a pulley 80 of the clutch 28, with an idler pulley 81 being engaged with the untoothed side of the belt 62 between pulleys 80 and 78. The forward pulley 78 drives a shaft 82 which carries two rollers 83 and 84 on which side extension strips 85 and 86 of the outer curtain 12 are wound, such strips being entrained over a pair of idler rollers 87 and 88 which are rotatably journalled on the shaft 74. The rearward pulley 77 drives a shaft, not shown, which is connected through a spring, also not shown, to a roller 90 on which the outer curtain is wound. With this arrangement, the outer curtain is tensioned in a manner similar to the tensioning of the inner curtain.

The clutch 28 includes an element which is connected to the rearward inner curtain pulley shaft 68. Through control of electrical energization of the clutch 28, the pulley 80 may either be clutched to the shaft 68 to interconnect the inner and outer curtain drives, or declutched from the shaft 68 to permit independent operation of the inner and outer curtain drives.

The shutter drive arrangement as shown is comparatively simple, uses a minimum number of component parts and is light in weight as well as being readily and economically manufacturable. At the same time, it permits highly accurate and reliable control of the shutter movements and of the width of the slit of the shutter, through the servo drive arrangement, under control of the profile generator. The system can be readily adjusted or automatically controlled in accordance with operating conditions in order to obtain optimum performance. Other advantages are obtained as will be apparent from the foregoing description in connection with the accompanying drawings.

It will be understood that modifications and variations may be effected without departing from the spirit and scope of the novel concepts of this invention.

We claim:

1. A photographic shutter, comprising: first and second curtains having opaque portions terminating at first and second edges which are positionable in spaced relation to define an exposure slit, support means supporting said curtains for movement of said slit in a certain path and through an exposure region, drive means including electrical servo motor means for driving said curtains to control the width of said slit and to move said slit through said exposure region, control circuit means for developing a command signal for control of movement of said slit through said exposure region, and drive circuit means for control of said servo motor means in accordance with said command signal to obtain a certain velocity of movement of said slit at each position of said slit in said exposure region.

2. A photographic shutter as defined in claim 1, said command signal being such as to obtain a substantially constant velocity throughout movement of said slit through said exposure region.

3. A photographic shutter as defined in claim 1, said certain path of movement of said slit being through first and second regions located between first and second limit positions of said slit and opposite first and second sides of said exposure region, and said command signal being such as to obtain predetermined rates of acceleration and deceleration of said slit when moving through said first and second regions.

4. A photographic shutter as defined in claim 3, said command signal being such as to gradually increase velocity of said slit from a zero velocity to a certain value when moving in one direction in said first region from said first limit position to said first side of said exposure region and to then maintain velocity at said certain value when moving in the same direction through said exposure region and to then gradually reduce velocity to zero when moving in the same direction in said second region between said second side of said exposure region and said second limit position.

5. A photographic shutter as defined in claim 4, said command signal being such as to gradually increase velocity of said slit from a zero velocity to a certain value when moving in an opposite direction in said second region from said second limit position to said second side of said exposure region and to then maintain velocity at said certain value when moving in said opposite direction through said exposure region and to said first side of said exposure region and to then gradually reduce velocity to zero when moving in said opposite direction in said second region between said first side of said exposure region and said first limit position.

6. A photographic shutter as defined in claim 1, said drive means including first and second rotatable elements having peripheral portions coupled to said first and second curtains for effecting movement of said curtains in said path in proportion to rotation of said elements, and said electrical servo motor means including a servo motor having a shaft coupled to said first rotatable element.

7. A photographic shutter as defined in claim 6, said electrical servo motor means further including a second servo motor having a shaft coupled to said second rotatable element, and said drive circuit means being arranged to control energization of the first and second servo motors to adjust the relative positions of said curtains and thereby control the width of said slit.

8. A photographic shutter as defined in claim 1, said electrical servo motor means including a servo motor coupled to said first curtain, position transducer means coupled to said first curtain to develop a position signal corresponding to the position of said first curtain, comparator means for comparing said position signal and said command signal to develop an output signal, and servo amplifier means for energizing said servo motor in accordance with the amplitude and sign of said output signal.

9. A photographic shutter as defined in claim 1, said control circuit means including a memory circuit for storing digital data to form said command signal.

10. A photographic shutter as defined in claim 9, a digital-to-analog converter for converting said digital data to command signal of analog form.

11. A photographic shutter, comprising: first and second curtains having opaque portions terminating at first and second edges which are positionable in spaced relation to define an exposure slit, support means supporting said curtains for movement of said slit in a certain path and through an exposure region, and drive means including electrical servo motor means for driving said curtains to control the width of said slit and to move said slit through said exposure region, said support means including first and second rotatable elements having peripheral portions coupled to said first and second curtains for effecting movement of said curtains in said path in proportion to the angle of rotation of said rotatable elements, and said electrical servo motor means including shaft means drivingly coupled to said rotatable elements.

* * * * *